UNITED STATES PATENT OFFICE.

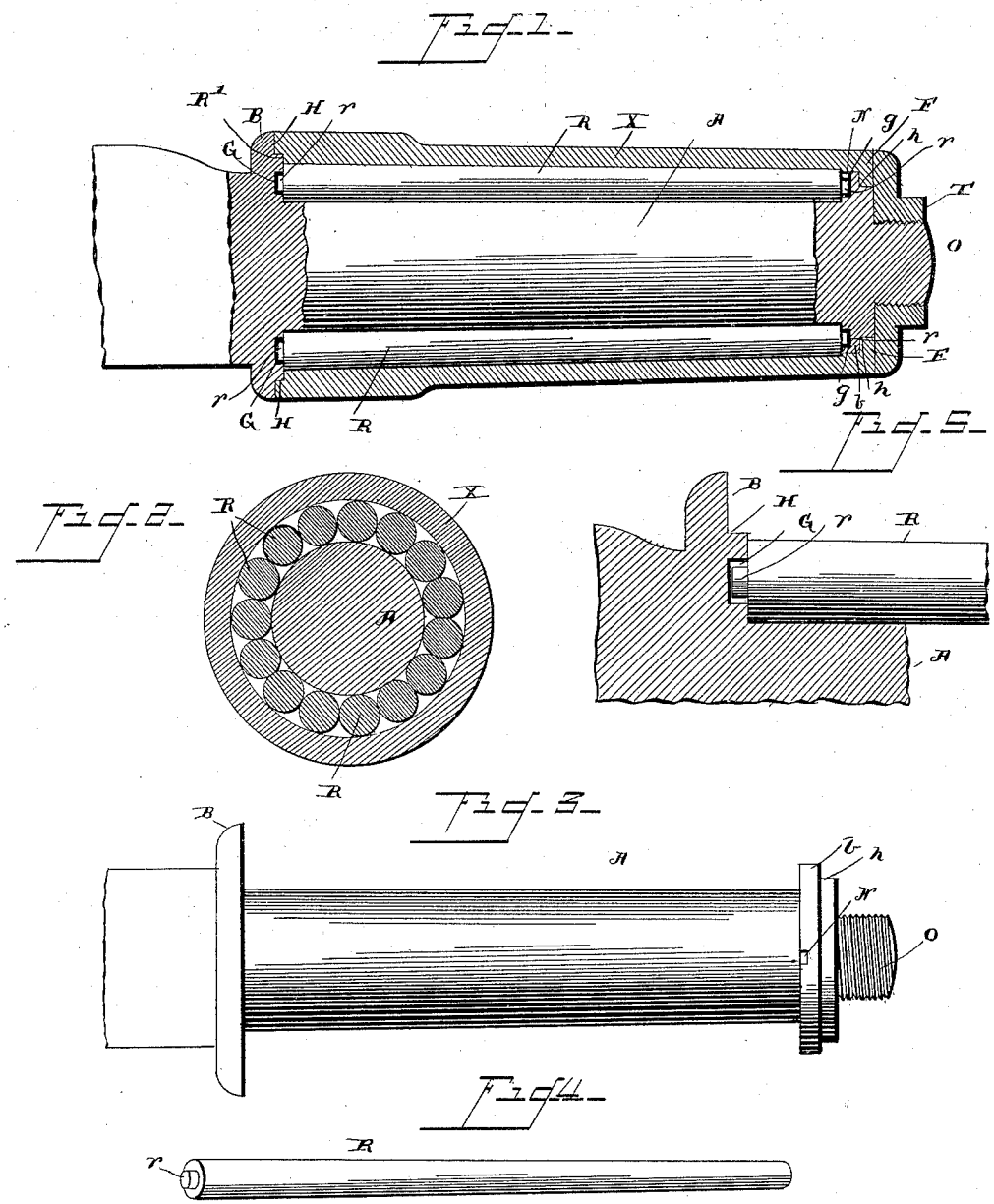

GEORGE JORGEN LARSON, OF CARPENTERSVILLE, ILLINOIS.

WAGON-SKEIN.

SPECIFICATION forming part of Letters Patent No. 432,882, dated July 22, 1890.

Application filed April 14, 1890. Serial No. 347,869. (No model.)

*To all whom it may concern:*

Be it known that I, GEORGE JORGEN LARSON, a citizen of the United States, residing at Carpentersville, in the county of Kane and State of Illinois, have invented a new and useful Wagon-Skein, of which the following is a specification.

This invention relates to vehicles, and more especially to the axles and axle-skeins thereof, and the same is an improvement upon all devices of this character heretofore made and applied to vehicles of any character.

The object of the invention is to provide a simple roller-bearing between the axle-skein and the hub or box which shall possess very few parts, and yet have all the qualifications and capabilities of a more complicated device, and this object I attain by the present invention, as hereinafter more fully described, and illustrated in the drawings, in which—

Figure 1 is a longitudinal section of the parts assembled. Fig. 2 is a cross-section thereof. Fig. 3 is a plan view, with the box and rollers removed. Fig. 4 is an enlarged perspective view of one of the rollers. Fig. 5 is an enlarged section, showing the manner in which the ends of the rollers are loosely fitted in the grooves.

Referring to the said drawings, the letter A represents the ordinary axle or skein, which is provided at its inner end with an annular shoulder B, having a groove G, and at its outer edge a half groove or recess H. The said skein is also provided near its outer end with a smaller annular shoulder $b$, having a similar groove $g$ and a half groove or recess $h$ on its outer face at its edge. Between these two shoulders fit the rollers R, whose bodies are slightly tapered throughout their lengths, and which are provided with bearings or reduced ends $r$, adapted to loosely enter the grooves G and $g$, but not to touch the sides or bottom thereof when the rollers are in place. The outer shoulder $b$ is provided with a notch N at its top, through which the outer end $r$ of the rollers R may be lifted, whereby said rollers can be removed from between the shoulders when desired.

X is the hub of the metallic box, which fits therein, this box having a flange F at its outer end, which fits in the recess $h$, and a recess R' in its inner end, which fits the recess H on the inner shoulder B when the parts are in position. By this means dust and dirt are prevented from entering the bearing, and the same is kept clean at all times.

T is the ordinary binding-nut screwed upon the threaded outer end O of the axle A, as will be understood. The relative sizes of these parts is such that when they are in place the rollers will bear at their inner sides upon the tapered exterior of the axle A and at their outer sides within the box X, and their journals $r$ will thereby be held out of contact with either side of the grooves within which they are seated. The shoulders at the ends of the rollers around their journals abut against the shoulders B and $b$, and the ends of the journals are thereby kept out of contact with the bottom of the grooves, and by this arrangement all wear upon the journals when in their normal positions is avoided. The diameters of the two shoulders B and $b$ are such that they stand close to yet out of contact with the interior of the box X; but the inner end of the latter abuts against the shoulder B and the inner side of its flange F at its outer end against the outer side of the shoulder $b$ to form a dust-guard, and the nut T bears tightly against the outer shoulder $b$ and loosely against the flange F. By this arrangement the friction between the parts is further considerably lessened without detracting from their perfection of mechanical operation or increasing their friction.

I claim as the salient points of this invention—

1. The axle-skein A, the shoulders B and $b$ at the inner and outer ends thereof, respectively, said shoulders having inwardly-facing grooves G and $g$, and the rollers R, having reduced ends $r$ less in width and length than the width and the depth of said grooves in which they are seated, whereby they will be out of contact therewith, in combination with the box B, fitting the outer face of the series of rollers, all substantially as and for the purpose described.

2. The axle-skein A, the shoulders B and $b$ at the inner and outer ends thereof, respectively, said shoulders having inwardly-facing grooves G and $g$, and the rollers R, having reduced ends *r* less in width than the width of said grooves in which they are seated, whereby they will be out of contact therewith, in combination with the box B, fitting the outer face of the series of rollers, all substantially as and for the purpose described.

3. The axle-skein A, the shoulders B and *b* at the inner and outer ends thereof, respectively, said shoulders having inwardly-facing grooves G and *g*, and the rollers R, having reduced ends *r* less in length than the depth of said grooves in which they are seated, whereby they will be out of contact therewith, in combination with the box B, fitting the outer face of the series of rollers, all substantially as and for the purpose described.

4. The axle-skein A, the shoulders B and *b* at the inner and outer ends thereof, respectively, said shoulders having inwardly-facing grooves G and *g*, the former having an inwardly-facing annular recess H and the latter an outwardly-facing annular recess *h*, and the rollers R, having reduced ends *r*, in combination with the box B, fitting the outer face of the series of rollers, its inner end having an annular recess R', loosely fitting that in the inner shoulder and its outer end loosely fitting around said outer shoulder, an inwardly-projecting flange F on the outer end thereof loosely fitting said recess *h* in the outer shoulder, and a binding-nut T, screwed onto the outer reduced end of the axle, all substantially as and for the purpose described.

5. The axle-skein A, the shoulders B and *b* at the inner and outer ends thereof, respectively, said shoulders having inwardly-facing grooves G and *g*, the former having an inwardly-facing annular recess H and the latter an outwardly-facing annular recess *h*, and the rollers R, having reduced ends *r*, in combination with the box B, fitting the outer faces of the series of rollers, its inner end loosely fitting the recess H in the inner shoulder and its outer end loosely fitting around said outer shoulder, an inwardly-projecting flange F on the outer end thereof loosely fitting said recess *h* in the outer shoulder, and a binding-nut T, screwed onto the outer end of the axle, all substantially as and for the purpose described.

6. The axle-skein A, the shoulders B and *b* at the inner and outer ends thereof, respectively, said shoulders having inwardly-facing grooves G and *g*, the latter having an outwardly-facing annular recess *h*, and the rollers R, having reduced ends *r*, in combination with the box B, fitting the outer face of the series of rollers, its inner end loosely fitting the inner shoulder, an inwardly-projecting flange F on the outer end thereof loosely fitting said recess *h* in the outer shoulder, and a binding-nut T, screwed onto the axle, all substantially as and for the purpose described.

7. The axle-skein A, the shoulders B and *b* at the inner and outer ends thereof, respectively, said shoulders having inwardly-facing grooves G and *g*, the former having an inwardly-facing annular recess H, and the rollers R, having reduced ends *r*, in combination with the box B, fitting the outer face of the series of rollers, its inner end having an annular recess R', loosely fitting that in the inner shoulder and its outer end loosely fitting around said outer shoulder, an inwardly-projecting flange F on the outer end thereof loosely fitting the outer shoulder, and a binding-nut T, all substantially as and for the purpose described.

8. The axle-skein A, the shoulders B and *b* at the inner and outer ends thereof, respectively, said shoulders having inwardly-facing grooves G and *g*, the latter having a notch N for the purpose set forth, and the rollers R, having reduced ends *r*, in combination with the box B, fitting the outer face of the series of rollers, all substantially as and for the purpose described.

In testimony that I claim the foregoing as my own I have hereto affixed my signature in presence of two witnesses.

GEORGE JORGEN LARSON.

Witnesses:
JOHN E. KELLY,
MICHAEL KELLEY.